United States Patent [19]
Heyes et al.

[11] 3,818,033
[45] June 18, 1974

[54] 5(4)-AMINO-SUBSTITUTED IMIDAZOLES

[75] Inventors: James Heyes, Peaslake; Neal Ward, Tadworth, both of England

[73] Assignee: Beecham Group Limited, Middlesex, England

[22] Filed: Aug. 23, 1971

[21] Appl. No.: 174,254

[30] Foreign Application Priority Data
Aug. 27, 1970 Great Britain.................... 41260/70

[52] U.S. Cl.... 260/309, 260/256.4 R, 260/256.5 R, 260/294.8 G, 260/295 R, 260/295 AM, 260/296 R, 260/302 H, 260/306.8 R, 260/329 S, 260/347.2, 424/251, 424/263, 424/270, 424/273

[51] Int. Cl............................................ C07d 49/36

[58] Field of Search......................... 260/309, 309.6

[56] References Cited
OTHER PUBLICATIONS

Cook et al. Chem. Abst. Vol. 44, columns 1962–1963 (1950). QD1.A51

Heilbron et al. Chem. Abst. Vol. 48, column 2093 (1954). QD1.A51

McFarland et al. J. Med. Chem. Vol. 12, pages 1066–1079 (1966). RS1.J5

Mironescu et al. Chem. Abst. Vol. 27, page 4231 (1933). QD1.A51

Primary Examiner—Natalie Trousof

[57] ABSTRACT

5(4)-amino-substituted imidazoles are disclosed which are useful as anthelmintics particularly against nematodes. Certain of these imidazole derivatives are novel per se. Pharmaceutical compositions comprising the 5(4)-amino-substituted imidazoles in combination with a pharmaceutically acceptable carrier, diluent or excipient are disclosed as well as methods of treating helminthiosis in animals utilizing these compositions.

13 Claims, No Drawings

5(4)-AMINO-SUBSTITUTED IMIDAZOLES

This invention relates to pharmaceutical compositions and their vetinary use as anthelmintics particularly against nematodes, and to certain novel imidazole derivatives and to processes for their production.

Accordingly the present invention provides a pharmaceutical composition comprising a substituted 5 - amino imidazole of the formula (I):

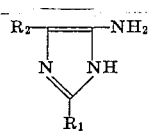

or a tautomeric form thereof (wherein $R_1$ is an unsubstituted aryl or heterocyclic group and $R_2$ is a hydrogen atom or an amide group or an optionally substituted phenyl or ester group) or an acid-addition salt, hydrate or hydrated salt thereof together with one or more pharmaceutically acceptable carriers, diluents or excipients and/or one or more other active compounds.

Suitable $R_1$ groups include the phenyl, naphthyl, thiazolyl, furyl, thienyl, pyridyl, pyrimidinyl and the like, the phenyl group being preferred.

Suitable groups $R_2$ include the phenyl, $NH_2CO$— and $CO_2R_3$ wherein $R_3$ is an optionally substituted alkyl, aralkyl or aryl group any of which may contain up to 12 carbon atoms. Preferred groups $R_2$ include the phenyl group and $CO_2R_3$ wherein $R_3$ is an alkyl group where the main chain contains an even number of carbon atoms.

The anthelmintic composition may take the form of a solution in water or other pharmaceutically acceptable solvents, or may take the form of a tablet or capsule or may be mixed with the animal feedstuffs.

A preferred anthelmintic composition contains one or more compounds of formula (I) dissolved or suspended in water which may also contain other biologically active compounds and/or thickening, flavouring, preserving and like ingredients.

When the anthelmintic of formula (I) is to be added to the animal food, it may, if required, be premixed with other diluents such as calcium carbonate, bran, flour and the like.

The invention also provides a method of treating helminthiasis in animals, which method comprises administering an imidazole of formula (I), generally together with one or more carriers, excipients or diluents. The compounds of formula (I) are preferably administered to animals in a drench taken orally.

Suitably 50 to 1,000 mg/kg bodyweight of the compound of formula (I) is administered orally. In general, a dose of 150 mg/kg kills most of the parasites in sheep while 500 mg/kg kills most parasites in chickens, thus a dosage range of 100 to 700 mg/kg is especially preferred. At such dosages, most compounds of formula (I) show good activity against nematodes in sheep and cattle and against Ascaridia galli in chickens.

The presence of this biological activity is especially surprising as certain compounds of similar structure have previously been prepared and have been reported to be biologically inactive. These have been reported in British Pat. Specifications Nos. 683,523, 683,593 and 683,594 and by Bader et al. in J. Chem. Soc., 1950, 2772-2784. The imidazoles reported in the above-mentioned British Specifications were prepared as intermediates in the synthesis of purines and were not shown to have any biological activity while Bader et al produced his imidazoles in search of "new drugs" (page 2775) but they were stated to "possess little or no activity"(page 2776).

Certain related imidazoles show considerable anti-inflammatory and/or analgesic effects. These compounds are disclosed in our co-pending application Ser. No. 174,253 of even date herewith.

Some of the compounds of formula (I) are novel, and accordingly the present invention also provides substituted 5-amino imidazoles of the formula (II):

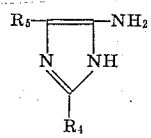

or a tautomeric form thereof (wherein $R_4$ is a heterocyclic group and $R_5$ is a hydrogen atom, an amide group or an optionally substituted phenyl or ester group) and acid-addition salts, hydrates or hydrated acid-addition salts thereof.

Preferred groups $R_4$ include the thiazolyl, thienyl, furyl, pyridyl, pyrimidyl and like groups.

Suitable values for $R_5$ include the hydrogen atom, the amide group and the optionally substituted phenyl or ester groups containing from one to 12 carbon atoms.

Preferred values for $R_5$ include the unsubstituted phenyl group and the group $CO_2R_6$ wherein $R_6$ is an ethyl, isopropyl, butyl, hexyl, or benzyl group optionally substituted by a halogen atom or by an alkoxy, aralkyloxy or aryloxy group, or an optionally substituted amino group.

Certain of these compounds are also of use as intermediates in the preparation of certain novel pharmaceutically useful imidazoles which have exhibited anti-viral, anti-inflammatory and anti-tumour activity.

In a further aspect the invention provides a process of preparing compounds of formula (II). This process is similar to that described in British Pat. Specification Nos. 683,523, 683,595 and 683,594 and comprises the reaction of a nitrile of formula (III) with an acid addition salt of a thioether of formula (IV) to give a salt of (II), after which the free base or alternative salt maybe formed if required.

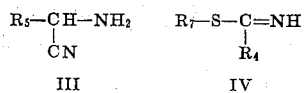

III        IV

Suitable groups $R_7$ include alkyl and aralkyl or aryl groups. Preferred groups $R_7$ include the ethyl and benzyl groups.

The reaction is generally affected in an inert solvent. Suitable solvents include halogenated hydrocarbons, such as chloroform, methylene bromide, methylene chloride and the like, alcohols such as methanol, ethanol, hexanol and the like, ethers such as tetrahydrofuran and the like and aromatic hydrocarbons such as benzene or toluene. Preferred solvents are chlorinated hydrocarbons, chloroform being especially preferred.

The reaction may be carried out at low, ambient or high temperatures, for example, from 0°–150°C. However, it has been found that a particularly suitable temperature range is from 50°–100°C. This reaction temperature may often be achieved by selecting a solvent that refluxed within this range, for example, chloroform or tetrahydrofuran.

Certain of the thioiminoethers of formula (IV) are novel. These compounds may be made by the reaction of benzyl thiol with a nitrile $NC-R_4$ in an acidic medium.

Suitable solvents include ethers, such as diethyl ether, tetrahydrofuran and the like. A preferred solvent is anhydrous diethyl ether.

In general the temperature will be carried out at a depressed temperature, for example, below 10°C, for example at 0°C.

The following Examples serve to illustrate the invention.

EXAMPLE 1

3-Thienylformimino benzyl thioether

The starting thioether hydrochloride is prepared as follows: 3-Cyanothiophene (11.9 g., 0.109 mole), benzyl mercaptan (20.8 g., 0.167 mole) and dry dioxan (100 ml.) were cooled to 0°C. Dry hydrogen chloride was slowly passed into the mixture for three hours, care being taken to prevent moisture from entering the flask. The mixture was kept at room temperature for 3 days, then dry diethyl ether (500 ml.) was added to give a crystalline precipitate. This solid was filtered off and washed well with diethyl ether to give 3-thienylformimino benzyl thioether hydrochloride (26.8 g., 90 percent), m.p. 154°–6°C.

EXAMPLE 2 – 7

The hydrochlorides of the following thioethers were made by a process analogous to that described in Example 1.

2   2-Thienylformimino benzyl thioether
3   4-Thiazolylformimino benzyl thioether
4   2-Furylformimino benzyl thioether
5   3-Pyridylformimino benzyl thioether
6   2-Pyrimidinylformimino benzyl thioether
7   2-Thiazolylformimino benzyl thioether

EXAMPLE 8

5-Amino-4-ethoxycarbonyl 2-(3'-thienyl) imidazole

3-Thienylformimino benzyl thioether hydrochloride (26.8 g., 0.1 mole) was refluxed in chloroform (200 ml) with ethyl aminocyanoacetate (25.0 g., 0.2 mole) for 1 hour. On standing for 8 hours and treatment with dry diethyl ether (250 ml), the hydrochloride salt of 5-amino-4-ethoxycarbonyl 2-(3'-thienyl) imidazole was formed. (25.9 g., 95%), m.p. 172°–3°C after recrystallisation from ethanol. Treatment of this salt with aqueous sodium carbonate gave the free base, m.p. 224°–5°C.

EXAMPLE 9 – 34

The compounds shown in the following table were prepared by a process analogous to that described in Example 8.

| Example No. | $R_4$ ($R_1$) | $R_5$ ($R_2$) | Melting point °C HCl Salt | Free Base |
|---|---|---|---|---|
| 9  | 2-thiazole   | ethoxycarbonyl      |         | 214–5°     |
| 10 | 4-thiazolyl  | ethoxycarbonyl      | 218–20° |            |
| 11 | 2-thienyl    | ethoxycarbonyl      | 207–8°  |            |
| 12 | 3-thienyl    | ethoxycarbonyl      |         | 224–5°     |
| 13 | 2-furyl      | do.                 |         | 208–9°     |
| 14 | 3-pyridyl    | do.                 |         | 222–4°     |
| 15 | phenyl       | H                   | 144–5°  |            |
| 16 | 3-thienyl    | H                   | 140–1°  |            |
| 17 | 3-thienyl    | phenyl              |         | 183°       |
| 18 | 2-thienyl    | phenyl              |         | 187°       |
| 19 | phenyl       | methoxycarbonyl     |         | 200–2°     |
| 20 | do.          | i-propoxycarbonyl   |         | 203–4°     |
| 21 | do.          | n-propoxycarbonyl   |         | 211–3°     |
| 22 | do.          | n-butoxycarbonyl    |         | 208–9°     |
| 23 | do.          | t-butoxycarbonyl    |         | 222–4°     |
| 24 | do.          | i-butoxycarbonyl    |         | 239–41°    |
| 25 | do.          | n-hexyloxycarbonyl  |         | 188.5–189.5 |
| 26 | do.          | n-dodecyloxcarbonyl |         | 139–41°    |
| 27 | do.          | benzyloxycarbonyl   |         | 223–5°     |
| 28 | do.          | CO N $H_2$          | 300°    |            |
| 29 | do.          | β-chloroethoxycarbonyl |      | 173–4°     |
| 30 | do.          | β-methoxyethoxycarbonyl | 126–8° |         |
| 31 | do.          | β-phenethoxycarbonyl |        | 265°       |
| 32 | 2-pyrimidinyl | ethoxycarbonyl     |         | 265°       |
| 33 | 3-thienyl    | benzyloxycarbonyl   |         | 240–3°     |
| 34 | 3-thienyl    | i-propoxycarbonyl   |         | 216–8°     |

EXAMPLES 35 – 37

The examples shown in the following table were prepared in a manner analgous to that of Example 8.

| Example No. | $R_1$ | $R_2$ | Melting Point °C HCl Salt | Free Base |
|---|---|---|---|---|
| 35 | Phenyl    | ethoxycarbonyl | 228° |        |
| 36 | Phenyl    | phenyl         | 271° |        |
| 37 | 2-naphthyl | ethoxycarbonyl |     | 236–7° |

EXAMPLE 38

5(4)-Amino-4(5)-ethoxycarbonyl-2-phenylimidazole hydrochloride (100 g.) was dispersed in water (750 ml.) containing gum arabic (5 g.)

EXAMPLE 39

The suspension of Example 38 (50 ml.) was administered to a 50 kg sheep with an oesophageal drenching gun; the treatment was followed by the administration of an equal amount of water.

EXAMPLE 40

The compounds of Example 9–37 were formulated in the manner described in Example 38. When administered to sheep or cattle at approximately 150 mg/kg, a considerable reduction in the infestation by the worms occurred.

EXAMPLE 41

5(4)-Amino-4(5)-phenyl 3-thienylimidazole (10 g.) was mixed with chicken food (200 g.). After consuming sufficient of the treated food to ensure an intake of approximately 500 mg/kg., the degree of infestation by Ascaridia galli in chickens was found to be reduced by about 90 percent.

We claim:

1. A 5(4)-amino-substituted imidazole of the formula:

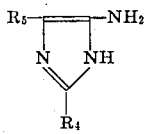

or tautomer thereof wherein $R_4$ is thienyl or furyl and $R_5$ is hydrogen, carboxamido, phenyl or a group of the formula $CO_2R_6$ wherein $R_6$ is alkyl of one to 12 carbon atoms or benzyl, a pharmaceutically acceptable acid-addition salt, hydrate or hydrated salt thereof.

2. A compound according to claim 1 wherein $R_6$ is lower alkyl.

3. A compound according to claim 1 wherein $R_5$ is ethoxycarbonyl.

4. A compound according to claim 1 wherein the 5(4)-amino-substituted imidazole is 5-amino-4-ethoxycarbonyl-2-(3'-thienyl) imidazole.

5. A compound according to claim 1 wherein $R_4$ is 2-thienyl and $R_5$ is ethoxycarbonyl and said 5(4)-amino-substituted imidazole is in the form of the free base or the hydrochloride salt.

6. A compound according to claim 1 wherein $R_4$ is 3-thienyl and $R_5$ is ethoxycarbonyl and said 5(4)-amino-substituted imidazole is in the form of the free base or the hydrochloride salt.

7. A compound according to claim 1 wherein $R_4$ is 2-furyl and $R_5$ is ethoxycarbonyl and said 5(4)-amino-substituted imidazole is in the form of the free base or the hydrochloride salt.

8. A compound according to claim 1 wherein $R_4$ is 3-thienyl and $R_5$ is hydrogen and said 5(4)-amino-substituted imidazole is in the form of the free base or the hydrochloride salt.

9. A compound according to claim 1 wherein $R_4$ is 3-thienyl and $R_5$ is phenyl and said 5(4)-amino-substituted imidazole is in the form of the free base or the hydrochloride salt.

10. A compound according to claim 1 wherein $R_4$ is 2-thienyl and $R_5$ is phenyl and said 5(4)-amino-substituted imidazole is in the form of the free base or the hydrochloride salt.

11. A compound according to claim 1 wherein $R_4$ is 3-thienyl and $R_5$ is benzyloxycarbonyl and said 5(4)-amino-substituted imidazole is in the form of the free base or the hydrochloride salt.

12. A compound according to claim 1 wherein $R_4$ is 3-thienyl and $R_5$ is i-propoxycarbonyl and said 5(4)-amino-substituted imidazole is in the form of the free base or the hydrochloride salt.

13. A compound according to claim 1, wherein $R_4$ is 3-thienyl and $R_5$ is ethoxycarbonyl.

* * * * *